US012008592B1

(12) United States Patent
Muthusamy et al.

(10) Patent No.: US 12,008,592 B1
(45) Date of Patent: Jun. 11, 2024

(54) STRATEGIC AND TACTICAL INTELLIGENCE IN DYNAMIC SEGMENTATION

(71) Applicant: Blue Yonder Group, Inc., Scottsdale, AZ (US)

(72) Inventors: Ganesh Muthusamy, Hyderabad (IN); Phani Bulusu, Bangalore (IN); Rashid Puthiyapurayil, Bangalore (IN); Abhishek Singh, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 129 days.

(21) Appl. No.: 17/738,495

(22) Filed: May 6, 2022

Related U.S. Application Data

(60) Provisional application No. 63/185,566, filed on May 7, 2021.

(51) Int. Cl.
*G06Q 30/02* (2023.01)
*G06Q 10/06* (2023.01)
(Continued)

(52) U.S. Cl.
CPC ..... *G06Q 30/0204* (2013.01); *G06Q 30/0201* (2013.01)

(58) Field of Classification Search
CPC .................. G06Q 30/02; G06Q 10/06
(Continued)

(56) References Cited

U.S. PATENT DOCUMENTS 7,523,483 B2  4/2009  Dogan et al.
11,544,724 B1*  1/2023  Wick ................. G06Q 30/0202
(Continued)

OTHER PUBLICATIONS

Johannes Fichtinger et al., "A joint network design and multi-echelon inventory optimisation approach for supply chain segmentation," International Journal of Production Economics, vol. 209, pp. 103-111, Mar. 2019.
(Continued)

*Primary Examiner* — Nga B Nguyen
(74) *Attorney, Agent, or Firm* — Spencer Fane LLP; Steven J. Laureanti

(57) ABSTRACT

A system and method for performing tactical segmentation including a supply chain network having a tactical segmentation planner, an inventory system, a transportation network, supply chain entities and a computer. The computer performs multi-dimension segmentation on input data by computing feature importance to generate multi-dimensional segments, assigns policy parameters to the supply chain network based on the generated multi-dimensional segments, trains a machine learning model by applying a cyclic boosting process to the standardized features data, where the cyclic boosting process iteratively learns relationships associated with the generated multi-dimensional segments, stores the machine learning model in a database, performs multi-dimension segmentation based on the stored machine learning model, determines whether data drift has occurred in the input data and in response to determining that data drift has occurred, repeats the perform, assign, trains steps, and stores an updated machine learning model in the database.

20 Claims, 9 Drawing Sheets

(51) Int. Cl.
*G06Q 30/0201* (2023.01)
*G06Q 30/0204* (2023.01)

(58) Field of Classification Search
USPC ........................................................ 705/7.33
See application file for complete search history.

(56) References Cited

U.S. PATENT DOCUMENTS

| | | | |
|---|---|---|---|
| 2015/0186795 A1* | 7/2015 | Chandra | G06N 20/20 706/12 |
| 2019/0042889 A1* | 2/2019 | Shang | G06F 18/28 |
| 2020/0134364 A1* | 4/2020 | Kuruvilla | G06F 18/214 |
| 2022/0366315 A1* | 11/2022 | Desreumaux | G06N 20/20 |

OTHER PUBLICATIONS

Janet Godsell et al., "Enabling supply chain segmentation through demand profiling," International Journal of Physical Distribution & Logistics Management, vol. 41, Issue 3, pp. 296-314, 2011.

* cited by examiner

STRATEGIC AND TACTICAL INTELLIGENCE IN DYNAMIC SEGMENTATION

CROSS REFERENCE TO RELATED APPLICATIONS

The present disclosure is related to that disclosed in the U.S. Provisional Application No. 63/185,566, filed May 7, 2021, entitled "Strategic and Tactical Intelligence in Dynamic Segmentation." U.S. Provisional Application No. 63/185,566 is assigned to the assignee of the present application. The subject matter disclosed in U.S. Provisional Application No. 63/185,566 is hereby incorporated by reference into the present disclosure as if fully set forth herein. The present invention hereby claims priority under 35 U.S.C. § 119(e) to U.S. Provisional Application No. 63/185,566.

TECHNICAL FIELD

The present disclosure relates generally to segmentation planning and more specifically to generating and updating segments autonomously.

BACKGROUND

Segmentation refers to the process of dividing one or more target markets into sub-sections, or segments, that can be targeted with specific products, communications and communication channels, supply chain logistical procedures, and/or other business processes. Segmentation is a complex task when performed manually, so dynamic segmentation may be employed to speed up the process of segmentation. However, dynamic segmentation itself presents several problems. For example, use of existing dynamic segmentation systems may result in frequent changes to the segment boundaries, due to noise in the data or frequent, but insignificant, changes in the data. Such frequent changes may themselves result in longer lead times for planners to understand the segmentation boundaries, confusion in the results of the segmentation, and may trigger change management protocols even when such protocols are unnecessary and wasteful. These outcomes result in inefficient allocation of supply chain inventory and sub-optimal service levels, and are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
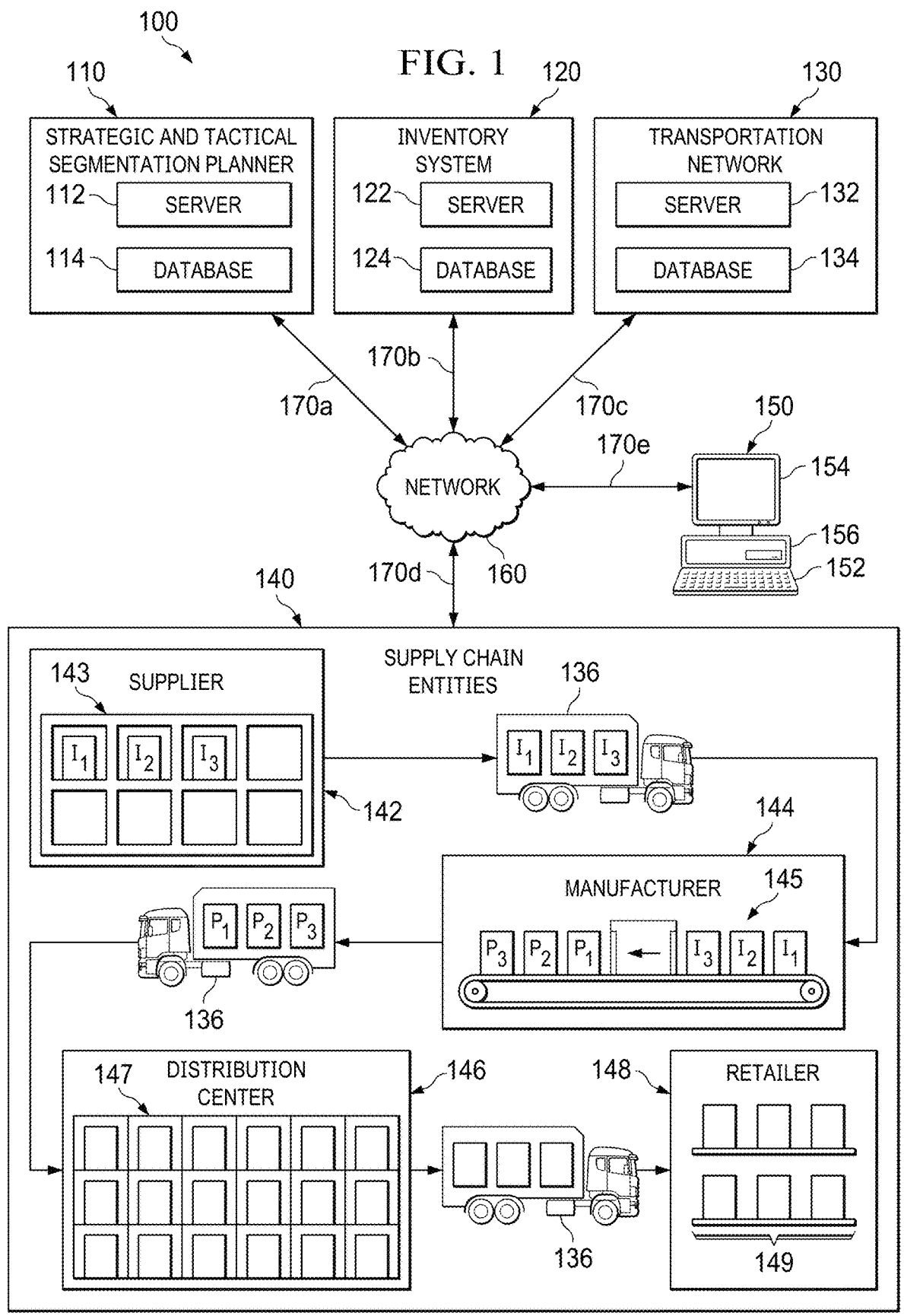
FIG. 1 illustrates an exemplary supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a strategic and tactical segmentation system and method to provide dynamic, adaptable market segmentation decisions for supply chain networks and business environments without unnecessarily altering segmentation boundaries due to insignificant changes in the data. Embodiments may provide a strategic level segmentation planner and tactical segmentation predictions. At the strategic level, embodiments utilize a segmentation planner to manage input data in (1) a comprehensive scenario using all data available and more extensive computation time, and/or (2) an agile scenario using a representative sample of available data and a reduced computation requirement, as compared to the comprehensive scenario. Embodiments of the strategic level segmentation planner discover segmentation features relevant to input data, and pre-process the data before generating segments. Embodiments analyze the generated segments for one or more unimportant or no-longer-relevant features and, if one or more unimportant or no-longer-relevant features are detected, the segmentation planner drops the unimportant or no-longer-relevant features from the list of segments. Embodiments of the segmentation planner generate one or more graphical user interface (GUI) displays visualizing the segments at the strategic and the tactical level, and assign policy parameters to the segments. Embodiments also train one or more machine learning models and/or algorithms to make tactical segmentation predictions for new input data based on the list of generated segments.

At the tactical level, embodiments maintain the broad contours of segmentation boundaries, previously generated by the strategic level segmentation planner, while using the trained one or more machine learning models and/or algorithms to segment new input data and predict segment intersections based on changes in input data. Whereas the strategic level segmentation planner may require significant time and computational resources to generate segments, and may accordingly only be performed on an infrequent or an as-needed basis, the tactical segmentation prediction may predict segments based on changes in input data quickly, efficiently, and frequently (such as, for example, on a daily basis). When tactical segment prediction method determines that significant changes in input data require the generation of new strategic segments, the strategic level simulation planner generates new segments using the full strategic segment generation process.

Embodiments enable segmentation planners to segment markets efficiently and automatically at both the strategic level and the tactical level. At the strategic level, embodiments select a sufficient number of segmentation features to adequately segment a market without over-granulizing the market with unnecessary segmentation features. Embodiments autonomously update segmentation decisions as new data become available, circumstances change, and as customers and other businesses enter and exit the market over time, without requiring significant human intervention and/or oversight. Embodiments automatically detect the presence of non-critical features and segments, and remove non-critical features and segments from segmentation planning to reduce operating expenses. At the tactical level, embodiments efficiently segment new input data and predict segment intersections without requiring the resources and time required to complete strategic level segmentation.

FIG. 1 illustrates exemplary supply chain network 100 according to a first embodiment. Supply chain network 100 comprises strategic and tactical segmentation planner 110, inventory system 120, transportation network 130, one or more supply chain entities 140, computer 150, network 160, and communication links 170A-170E. Although a single strategic and tactical segmentation planner 110, inventory system 120, transportation network 130, one or more supply chain entities 140, a single computer 150, and a single network 160 are shown and described, embodiments contemplate any number of strategic and tactical segmentation planners 110, inventory systems 120, transportation networks 130, supply chain entities 140, computers 150, or networks 160, according to particular needs.

In one embodiment, strategic and tactical segmentation planner 110 comprises server 112 and database 114. As described in more detail below, strategic and tactical segmentation planner 110 comprises one or more modules to, for example, perform a strategic multi-dimension segmentation to discover segmentation features, generate segments, and to compute the importance of one or more segmentation features; and perform a tactical segmentation of new input data 220 and prediction of segment intersections using one or more machine learning models and/or algorithms.

Inventory system 120 comprises server 122 and database 124. Server 122 of inventory system 120 is configured to receive and transmit inventory data, including but not limited to item identifiers, pricing data, attribute data, features data 224, inventory levels, and other like data about one or more items or products at one or more locations in supply chain network 100. Server 122 stores and retrieves inventory data from database 124 or from one or more locations in supply chain network 100.

According to embodiments, database 124 includes current or projected inventory quantities or states, order rules, or explanatory variables. For example, database 124 may comprise the current level of inventory for each item at one or more stocking points across supply chain network 100. In addition, database 124 may comprise order rules that describe one or more rules or limits on setting an inventory policy, including, but not limited to, a minimum order quantity, a maximum order quantity, a discount, and a step-size order quantity, and batch quantity rules. According to some embodiments, database 124 may comprise explanatory variables that describe the data relating to specific past, current, or future indicators and the data of promotions, seasonality, special events (such as sporting events), weather, and the like. According to some embodiments, strategic and tactical segmentation planner 110 accesses and stores inventory data in database 124, which may be used by strategic and tactical segmentation planner 110 to generate one or more segments according to the methods described herein. In addition, or as an alternative, the inventory data of database 124 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles to ship one or more items between one or more supply chain entities 140, based, at least in part, on segments and/or instruction sets generated by strategic and tactical segmentation planner 110. The transportation vehicles comprise, for example, any number of trucks, cars, vans, boats, airplanes, unmanned aerial vehicles (UAVs), cranes, robotic machinery, or the like. The transportation vehicles may comprise radio, satellite, or other communication systems that communicate location information (such as, for example, geographic coordinates, distance from a location, global positioning satellite (GPS) information, or the like) with strategic and tactical segmentation planner 110, inventory system 120, transportation network 130, and/or one or more supply chain entities 140 to identify the location of the transportation vehicle and the location of any inventory or shipment located on the transportation vehicle. The number of items shipped by transportation vehicles in transportation network 130 may also be based, at least in part, on the number of items currently in stock at one or more supply chain entities 140, the number of items currently in transit in transportation network 130, a forecasted demand, a supply chain disruption, and the like.

As shown in FIG. 1, supply chain network 100 operates on one or more computers 150 that are integral to or separate from the hardware and/or software that support strategic and tactical segmentation planner 110, inventory system 120, transportation network 130, and one or more supply chain entities 140. Supply chain network 100 comprising strategic and tactical segmentation planner 110, inventory system 120, transportation network 130, and one or more supply chain entities 140 may operate on one or more computers 150 that are integral to or separate from the hardware and/or software that support strategic and tactical segmentation planner 110, inventory system 120, transportation network 130, and one or more supply chain entities 140. One or more computers 150 may include any suitable input device 152, such as a keypad, mouse, touch screen, microphone, or other device to input information. One or more computers 150 may also include any suitable output device 154, such as, for example, computer monitor, that may convey information associated with the operation of supply chain network 100, including digital or analog data, visual information, or audio information. Computer 150 may include fixed or removable computer-readable storage media 156, including a non-transitory computer readable medium, magnetic computer disks, flash drives, CD-ROM, in-memory device or other suitable media to receive output from and provide input to supply chain network 100.

Computer 150 may include one or more processors and associated memory to execute instructions and manipulate information according to the operation of supply chain network 100 and any of the methods described herein. One or more processors may execute an operating system program stored in memory to control the overall operation of computer 150. For example, one or more processors control the reception and transmission of signals within the system. One or more processors execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, supply chain network 100 may comprise a cloud-based computing system having processing and storage devices at one or more locations, local to, or remote from strategic and tactical segmentation planner 110, inventory system 120, transportation network 130, and one or more supply chain entities 140. In addition, each of One or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with strategic and tactical segmentation planner 110, inventory system 120, transportation network 130, and one or more supply chain entities 140.

These one or more users may include, for example, a "manager" or a "planner" handling generation of segments, supply chain plans and instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, shelving resets, task management, communication and assignment of instructions, issue identification and resolution, controlling manufacturing equipment, and adjusting various levels of manufacturing and inventory levels at various stocking points and distribution centers 146, and/or one or more related tasks within supply chain network 100.

One or more supply chain entities 140 represent one or more supply chain networks 100, including one or more enterprises, such as, for example networks of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers 144 based, at least in part, on supply chain plans and/or instruction sets determined by strategic and tactical segmentation planner 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on supply chain plans and/or instruction sets determined by strategic and tactical segmentation planner 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on one or more supply chain plans generated by strategic and tactical segmentation planner 110.

Retailers 148 may be any suitable entity that obtains one or more products to sell to one or more customers. Retailers 148 may (like the other one or more supply chain entities 140) comprise a corporate structure having a retail headquarters and one or more retail stores. Retail headquarters comprises a central planning office with oversight of one or more retail stores. Retailer 148 stores may comprise any online or brick-and-mortar store, including stores with shelving systems 149. The one or more retail stores may sell products according to rules, strategies, orders, and/or guidelines developed by one or more retail headquarters. For example, retail headquarters may create supply chain plans that determine how the store will shelve or display one or more products. Although supply chain plan execution may be performed in part by one or more retail employees, embodiments contemplate automated configuration of shelving and retail displays. This may include, for example, automated robotic shelving machinery that places products on shelves or automated shelving that automatically adjusts based, at least in part, on the supply chain plans. Shelving systems 149 may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are shown and described as separate and distinct entities, the same entity may simultaneously act as any one of one or more supply chain entities 140. For example, one or more supply chain entities 140 acting as a manufacturer can produce a product, and the same one or more supply chain entities 140 can act as a supplier to supply an item to itself or another one or more supply chain entities 140. Although one example of supply chain network 100 is shown and described in FIG. 1, embodiments contemplate any configuration of supply chain network 100, without departing from the scope described herein.

In one embodiment, each of strategic and tactical segmentation planner 110, inventory system 120, transportation network 130, computer 150, and supply chain entities 140 may be coupled with network 160 using communications link 170A-170E, which may be any wireline, wireless, or other link suitable to support data communications between strategic and tactical segmentation planner 110 and network 160 during operation of supply chain network 100. Although communication links 170A-170E are shown as generally coupling strategic and tactical segmentation planner 110, inventory system 120, transportation network 130, one or more supply chain entities 140, and computer 150 to network 160, any of strategic and tactical segmentation planner 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling strategic and tactical segmentation planner 110, inventory system 120, transportation network 130, one or more supply chain entities 140, and computer 150. For example, data may be maintained locally to, or externally of strategic and tactical segmentation planner 110, inventory system 120, transportation network 130, one or more supply chain entities 140, and computer 150 and made available to one or more associated users of strategic and tactical segmentation planner 110, inventory system 120, transportation network 130, one or more supply chain entities 140, and computer 150 using network 160 or in any other appropriate manner. For example, data may be maintained in a cloud database at one or more locations external to strategic and tactical segmentation planner 110, inventory system 120, transportation network 130, one or more supply chain entities 140, and computer 150 and made available to one or more associated users of strategic and tactical segmentation planner 110, inventory system 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, strategic and tactical segmentation planner 110 may generate segments, supply chain plans, and/or instruction sets for the inventory of one or more supply chain entities 140 in supply chain network 100. Furthermore, strategic and tactical segmentation planner 110, inventory system 120, and/or transportation network 130 may instruct automated machinery (i.e., robotic warehouse systems, robotic inventory systems, automated guided vehicles, mobile racking units, automated robotic production machinery 145, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more supply chain plans and instruction sets, generated plans and policies and/or current inventory or production levels. When the inventory of an item falls to a reorder point, strategic and tactical segmentation planner 110 may automatically adjust product mix ratios, inventory levels, production of products of manufacturing equipment, and proportional or alternative sourcing of one or more supply chain entities 140 until the inventory is resupplied to a target quantity.

For example, the methods described herein may include computers 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 150 looking up the received product data in a database system associated with strategic and tactical segmentation planner 110, inventory system 120, and/or transportation network 130 to identify the item corresponding to the product data received from the automated machinery.

Computers 150 may also receive, from the automated machinery, a current location of the identified item. Based on the identification of the item, computers 150 may also identify (or alternatively generate) a first mapping in the database system, where the first mapping is associated with the current location of the item. Computers 150 may also identify a second mapping in the database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, as least in part, on one or more differences between the first mapping and the second mapping such as, for example, to locate an item to add to or remove from a shelf or an inventory of or shipment for one or more supply chain entities 140. In addition, or as an alternative, strategic and tactical segmentation planner 110 may monitor the supply chain constraints of one or more items at one or more supply chain entities 140 and adjusts the orders and/or inventory of one or more supply chain entities 140 based on the supply chain constraints.

Although the systems and methods are described below primarily in connection with supply chain network 100 solely for the sake of clarity, embodiments contemplate the systems and methods described herein generating segments and segmentation predictions in any business environment and with any number of participating customers, demographics, and/or other business entities, and in response to any number of features, intersections, products, and/or items.

Figure 2:
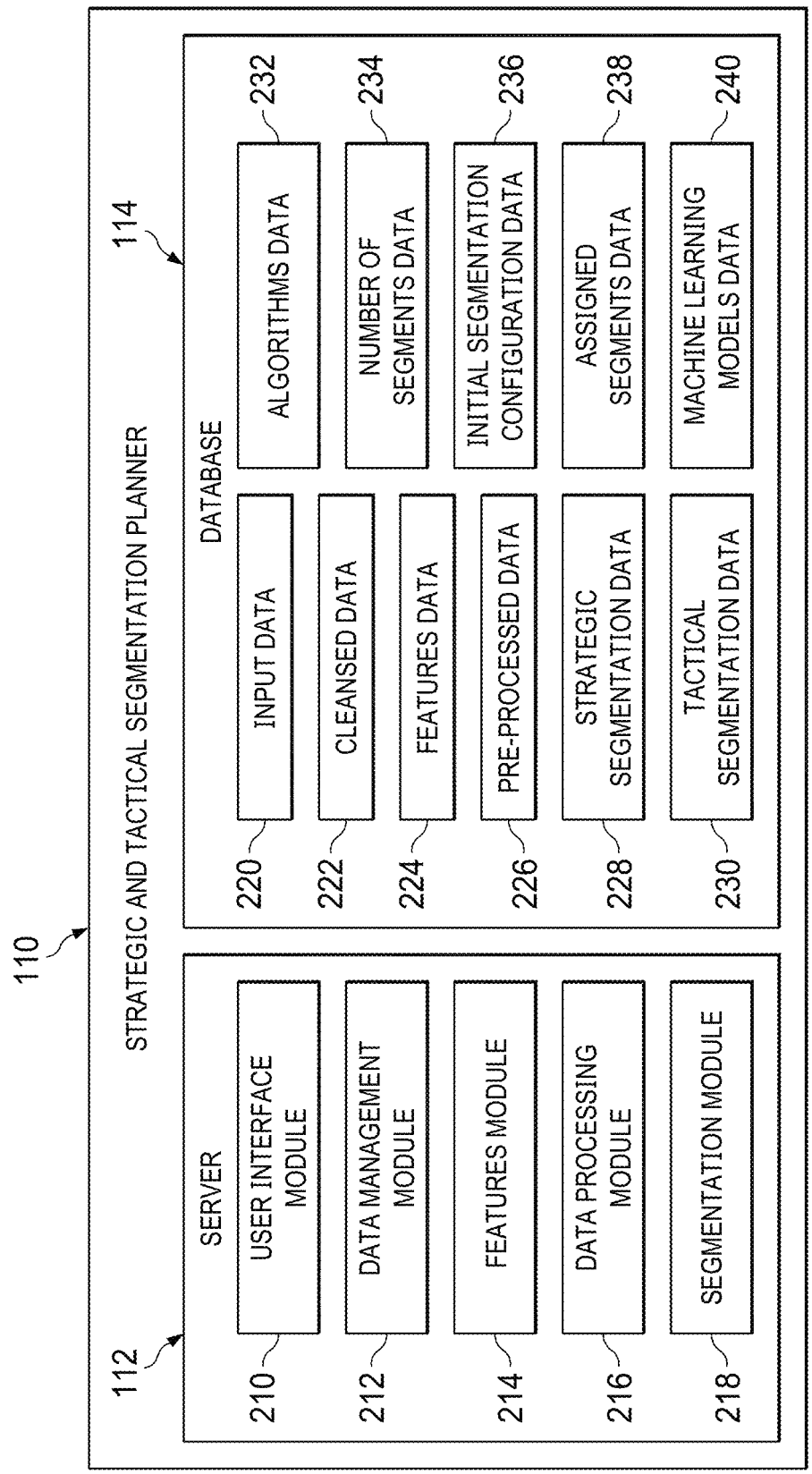
FIG. 2 illustrates the strategic and tactical segmentation planner of FIG. 1 in greater detail, in accordance with an embodiment.

FIG. 2 illustrates strategic and tactical segmentation planner 110 of FIG. 1 in greater detail in accordance with an embodiment. As described above, strategic and tactical segmentation planner 110 may comprise one or more computers 150 at one or more locations including associated input devices 152, output devices 154, non-transitory computer-readable storage media 156, processors, memory, or other components for receiving, processing, storing, and communicating information according to the operation of supply chain network 100. Additionally, strategic and tactical segmentation planner 110 comprises server 112 and database 114. Although strategic and tactical segmentation planner 110 is shown as comprising a single server 112 and a single database 114, embodiments contemplate any suitable number of computers 150, servers 112, or databases 114 internal to or externally coupled with strategic and tactical segmentation planner 110. According to some embodiments, strategic and tactical segmentation planner 110 may be located internal to one or more retailers 148 of one or more supply chain entities 140. In other embodiments, strategic and tactical segmentation planner 110 may be located external to one or more retailers 148 of one or more supply chain entities 140 and may be located in, for example, a corporate retailer of one or more retailers 148, according to particular needs.

Server 112 of strategic and tactical segmentation planner 110 may comprise user interface module 210, data management module 212, features module 214, data processing module 216, and segmentation module 218. Although server 112 is illustrated and described as comprising a single user interface module 210, data management module 212, features module 214, data processing module 216, and segmentation module 218, embodiments contemplate any suitable number or combination of these located at one or more locations, local to, or remote from strategic and tactical segmentation planner 110, such as on multiple servers 112 or computers 150 at any location in supply chain network 100.

According to embodiments, user interface module 210 receives and processes a user input, such as, for example, input received by input device 152 of one or more computers 150. One or more computers 150 may transmit input to strategic and tactical segmentation planner 110 using one or more communication links 170A-170E. User interface module 210 may register the input from one or more computers 150 and transmit the input to data management module 212 and/or features module 214, data processing module 216, and segmentation module 218. In an embodiment, user interface module 210 generates and displays a user interface (UI), such as, for example, a graphical user interface (GUI), that displays one or more interactive visualizations of segmentations, features, intersections, and/or other data. User interface module 210 may generate one or more GUI displays. The one or more GUI displays may convey information, including supply chain plan data, strategic and/or tactical segmentation data 230, and/or any other type of information about supply chain network 100 and segmentation.

Data management module 212 may access input data 220 stored in strategic and tactical segmentation planner database 114, and may transform input data 220 to generate cleansed data 222. In an embodiment, data management module 212 may also check cleansed data 222 for data drift by compare a first segment, subset, or portion of cleansed data 222 to a second segment, subset, or portion of cleansed data 222 and/or input data 220 to determine if the first segment, subset or portion has drifted far enough from the second segment, subset or portion as to require the generation of updated strategic segments.

Features module 214 may access cleansed data 222 and may analyze cleansed data 222 to locate one or more features. Having located one or more features, features module 214 may store the one or more features in features data 224 of strategic and tactical segmentation planner database 114.

Data processing module 216 may access features data 224 and may perform pre-processing actions on features data 224 to generate pre-processed data 226. Data processing module 216 may store pre-processed data 226 in strategic and tactical segmentation planner database 114 pre-processed data 226. Data processing module 216 may train one or more machine learning models and/or other algorithms to perform a tactical segmentation of new data and predict segment intersections. In an agile scenario embodiment, data processing module 216 may train one or more supervised machine learning models and/or other algorithms, using a sample portion of data stored in input data 220, pre-processed data 226, and/or initial segmentation configuration data 236, to (1) predict strategic segments for one or more remaining segment intersections, and/or (2) predict tactical segments, as described in greater detail below.

Segmentation module 218 may perform multi-dimension segmentation on pre-processed data 226 and may compute feature importance to generate segments, which segmentation module 218 may store in strategic segmentation data 228, as described in greater detail below. Segmentation module 218 may also use one or more machine learning models and/or algorithms to perform a tactical segmentation of new data and predict segment intersections.

Database 114 of strategic and tactical segmentation planner 110 may comprise one or more databases or other data storage arrangements at one or more locations, local to, or remote from, server 112. Database 114 may comprise, for example, input data 220, cleansed data 222, features data 224, pre-processed data 226, strategic segmentation data 228, tactical segmentation data 230, algorithms data 232, number of segments data 234, initial segmentation configuration data 236, assigned segments data 238, and machine learning models data 240. Although database 114 is shown and described as comprising input data 220, cleansed data 222, features data 224, pre-processed data 226, strategic segmentation data 228, tactical segmentation data 230, algorithms data 232, number of segments data 234, initial segmentation configuration data 236, assigned segments data 238, and machine learning models data 240, embodiments contemplate any suitable number or combination of these, located at one or more locations, local to, or remote from, strategic and tactical segmentation planner 110 according to particular needs.

Input data 220 may comprise, for example, any data relating to the supply chain system. Input data 220 may comprise data relating to supply chain entities 140, previous supply chain plans, transactions and shipments between supply chain entities 140, or past sales, past demand, purchase data, promotions, events, or the like of one or more products and/or one or more supply chain entities 140. Input data 220 may comprise data regarding one or more features assigned to one or more products, items, or resources manufactured, transported, or sold throughout the supply chain system. Input data 220 may be stored and/or updated at time intervals such as, for example, by the minute, hour, daily, weekly, monthly, quarterly, yearly, or any suitable time interval, including substantially in real time.

Cleansed data 222 may comprise data in which data management module 212 has determined segment intersections, converted input data 220 from one data storage format into another data storage format, and/or executed any other data modification or cleansing actions.

Features data 224 may comprise data in which features module 214 has discovered one or more features, aggregated or dis-aggregated cleansed data 222, and/or executed any other feature discovery actions.

Pre-processed data 226 may comprise data that have been pre-processed by data processing module 216 to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224).

Strategic segmentation data 228 may comprise data relating to one or more strategic segments generated by segmentation module 218 during the process of performing a strategic segment generation, as described in greater detail below.

Tactical segmentation data 230 may comprise data relating to one or more tactical segments and/or predictions generated by segmentation module 218 during the process of performing a tactical segment prediction.

Algorithms data 232 may comprise data related to one or more algorithms accessed by segmentation module 218 to perform autonomous segmentation. Segmentation module 218 may select an algorithm from algorithms data 232 based on whether the data to be processed is string-based or numerical-based, with some algorithms of algorithms data 232 tailored for use with string-based data and other algorithms of algorithms data 232 tailored for use with numerical-based data.

Number of segments data 234 may store the number of segments selected by segmentation module 218 during the activities of comprehensive segment analysis method described in greater detail below.

Initial segmentation configuration data 236 may comprise data related to one or more initial segment configurations, generated by segmentation module 218 during the activities of comprehensive segment analysis method.

Assigned segments data 238 comprises data related to one or more assigned segments generated by segmentation module 218 during the activities of comprehensive segment analysis method. According to embodiments, assigned segments data 238 may also comprise data relating to the relative importance of one or more features stored in assigned segments data 238.

Machine learning models data 240 may comprise data relating to one or more machine learning models and/or one or more algorithms trained by data processing module 216, as described in greater detail below.

Figure 3:
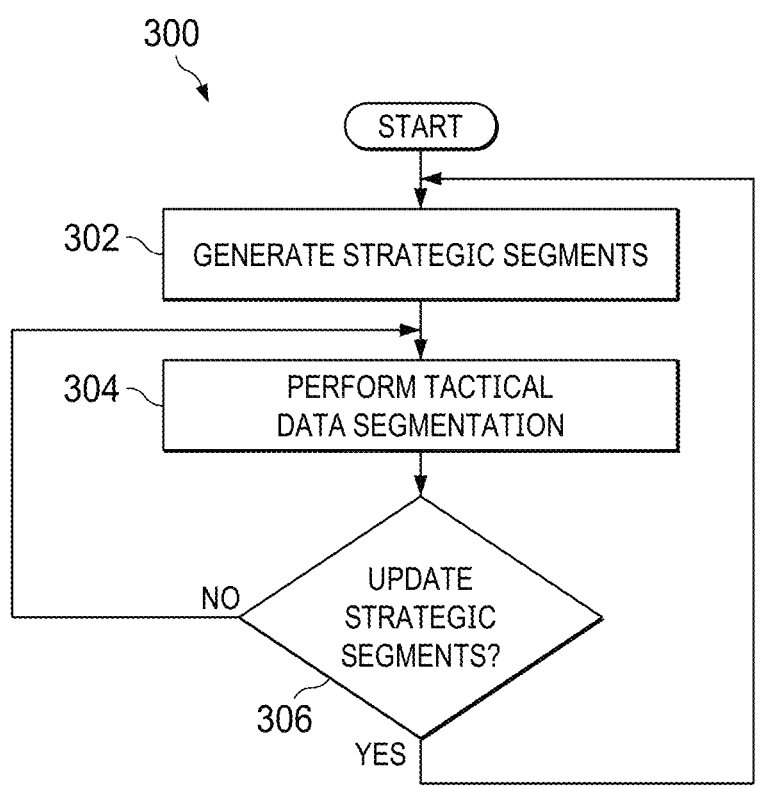
FIG. 3 illustrates an exemplary segmentation workflow method, according to an embodiment.

FIG. 3 illustrates exemplary segmentation workflow method 300, according to an embodiment. Segmentation workflow method 300 proceeds by one or more activities, which although described in a particular order may be performed in one or more permutations, combinations, orders, or repetitions, according to particular needs.

At activity 302 of segmentation workflow method 300, strategic and tactical segmentation planner 110 generates strategic segments. In an embodiment, strategic and tactical segmentation planner 110 may use strategic segment generation method 400, illustrated by FIG. 4, and comprehensive segment analysis method 500, illustrated by FIG. 5, to generate strategic segments. According to embodiments, strategic and tactical segmentation planner 110 may generate strategic segments at activity 302 of segmentation workflow method 300 in (1) a comprehensive scenario using all data available and more extensive computation time, and/or (2) an agile scenario using a representative sample of available data and a reduced computation requirement, as described in greater detail with reference to FIG. 4 below. Having generated strategic segments, strategic and tactical segmentation planner 110 stores the generated segments in strategic segmentation data 228.

At activity 304 of segmentation workflow method 300, strategic and tactical segmentation planner 110 performs tactical data segmentation and predicts one or more segments. In an embodiment, strategic and tactical segmentation planner 110 may use tactical segment prediction method 700, illustrated by FIG. 7, to predict one or more segments. Having predicted one or more segments, strategic and tactical segmentation planner 110 stores the one or more predicted segments in tactical segmentation data 230.

At activity 306 of segmentation workflow method 300, strategic and tactical segmentation planner 110 determines whether to update the strategic segments stored in strategic segmentation data 228. In an embodiment, strategic and tactical segmentation planner 110 may perform tactical data segmentation on a frequent basis (such as, for example, hourly, daily, or weekly), and may generate strategic segments less frequently (such as, for example, monthly, quarterly, or yearly) in response to determining that data drift has occurred in input data 220 and/or cleansed data 222, and that the generation of new strategic segments is necessary to preserve data integrity. In an embodiment, data management module 212 may compare a first segment, subset, or portion of input data 220 to a second segment, subset, or portion of input data 220 to determine if the first segment, subset or portion of data has drifted far enough from the second segment, subset or portion of data as to require the generation of updated strategic segments. For example, in an embodiment, strategic and tactical segmentation planner 110 may generate strategic segments using input data 220 that was current as of Jan. 1, 2021. Strategic and tactical segmentation planner 110 may continuously receive updated input data 220 as 2021 continues, and may repeatedly perform tactical data segmentation on the updated input data 220, using the strategic segments generated with the Jan. 1, 2021 input data, while also determining whether to update the original strategic segments generated with the Jan. 1, 2021 input data. In this example, on Apr. 1, 2021, data management module 212 compares the Apr. 1, 2021 input data to the Jan. 1, 2021 input data, and determines the Apr. 1, 2021 input data has drifted a sufficiently significant distance from the Jan. 1, 2021 data so as to require the generation of updated strategic segments. In this example, strategic and tactical segmentation planner 110 halts further tactical data segmentation activities, and returns to activity 302 of segmentation workflow method 300 to generate updated strategic segments.

If strategic and tactical segmentation planner 110 determines that strategic segments should be updated, strategic and tactical segmentation planner 110 ceases further tactical data segmentation activities and returns to activity 302 of segmentation workflow method 300 to generate updated strategic segments. If, on the other hand, strategic and tactical segmentation planner 110 determines that no updates to strategic segments are required, strategic and tactical segmentation planner 110 may return to the activities of tactical segment prediction method 700 and may continue predicting one or more segments and/or tactical data segmentations.

Figure 4:
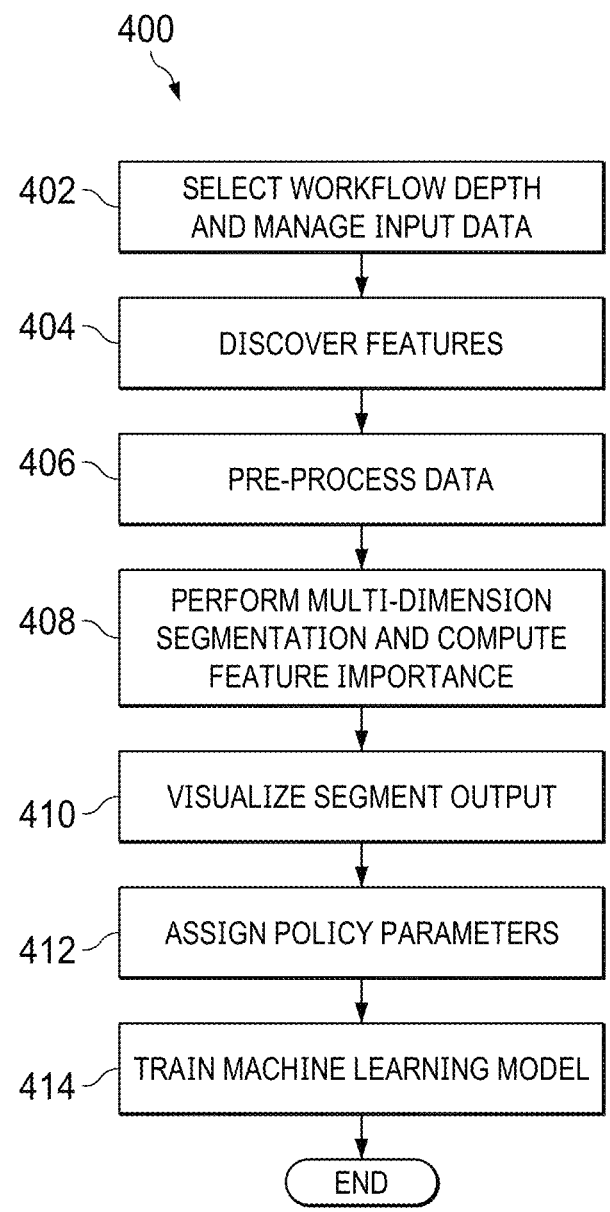
FIG. 4 illustrates an exemplary strategic segment generation method, according to an embodiment.

FIG. 4 illustrates exemplary strategic segment generation method 400 in which strategic and tactical segmentation planner 110 generates and visualizes strategic-level segments, according to an embodiment. The following strategic segment generation method 400 proceeds by one or more activities, which although described in a particular order may be performed in one or more permutations, combinations, orders, or repetitions, according to particular needs.

At activity 402 of strategic segment generation method 400, data management module 212 selects a segmentation workflow depth, manages input data 220, and generates cleansed data 222. In an embodiment, data management module 212 selects a segmentation workflow depth by determining whether to generate segments utilizing the activities of strategic segment generation method 400 in (1) a comprehensive scenario using all data available and more extensive computation time, and/or (2) an agile scenario using a representative sample of data and a reduced computation requirement. Data management module 212 may respond to one or more inputs detected by user interface module 210, including but not limited to input detected to one or more computer input devices 152, to select either a comprehensive scenario or an agile scenario. In a comprehensive scenario, strategic segment generation method 400 utilizes all available input data 220 stored in strategic and tactical segmentation planner database 114 to execute the other activities of strategic segment generation method 400. In an agile scenario, strategic segment generation method 400 selects a portion of the full data set available in input data 220 with which to execute the other activities of strategic segment generation method 400 and tactical segment prediction method 700, described below.

Data management module 212 accesses input data 220 stored in strategic and tactical segmentation planner database 114. In an embodiment, data management module 212 determines segment intersections based on input data 220. For example, in an embodiment, input data 220 may comprise three items (Items A, B and C), each of which is stored in varying degrees of stock at three locations (Supplier X, Y, and Z). Data management module 212 may select granular intersections, in which the exact quantity of each of Items A, B and C at each of Suppliers X, Y, and Z is imported into cleansed data 222. In other embodiments, data management module 212 may select broader, less granular intersections, in which only the total quantities of Items A, B and C across all three Suppliers X, Y, and Z are imported into cleansed data 222. These examples are provided for illustrative purposes only, and embodiments contemplate data management module 212 selecting any form of segment intersections while generating cleansed data 222, using any intersection selection criteria, according to particular needs. In some embodiments, user interface module 210 responds to input to one or more computer input devices 152, and selects one or more segment intersections directly.

Data management module 212 may transform input data 220 to generate cleansed data 222. Data transformation may comprise converting input data 220 from one data storage format into another data storage format; copying one or more pre-discovered features stored in input data 220 into cleansed data 222; removing one or more pre-discovered features stored in input data 220; and/or any other data modification or cleansing actions. In a comprehensive scenario, data management module 212 transforms all available input data 220 stored in strategic and tactical segmentation planner database 114 to generate cleansed data 222. In an agile scenario, data management module 212 selects a representative sample of the full data set available in input data 220, and performs a dimensionality reduction on the representative sample to generate cleansed data 222. In either scenario, having generated cleansed data 222, data management module 212 stores cleansed data 222 in strategic and tactical segmentation planner database 114 cleansed data 222.

At activity 404 of strategic segment generation method 400, features module 214 discovers features. Features module 214 accesses cleansed data 222 and discovers features in cleansed data 222 to generate features data 224. In an embodiment, features module 214 accesses cleansed data 222 and aggregates or dis-aggregates cleansed data 222 based on one or more segment intersections to discover features and generate features data 224. Features module 214 may aggregate or dis-aggregate cleansed data 222 based on, for example, a focus on one or more products or resources manufactured, transported, or sold throughout the supply chain system; one or more locations or geographic regions throughout the supply chain system; or based on any other focus or intersection, according to particular needs. Features module 214 may aggregate or dis-aggregate cleansed data 222 using one or more direct input features (such as, for example, price), and/or one or more derived features that features module 214 may compute based on one or more other features stored in cleansed data 222. Having discovered one or more features, features module 214 stores the one or more features in features data 224. In an embodiment, user interface module 210 responds to input to one or more computer input devices 152, and inputs one or more features directly into features data 224.

At activity 406 of strategic segment generation method 400, data processing module 216 pre-processes features data 224 to generate pre-processed data 226. According to embodiments, data processing module 216 may access features data 224 and pre-process features data 224 in order to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224). In an embodiment, data processing module 216 reduces the dimensions of one or more features stored in features data 224 to emphasize one or more other features. Data processing module 216 may perform data interpretation on features data 224 to emphasize one or more numerical features, and/or one or more string features, in pre-processed data 226. Having generated pre-processed data 226, data processing module 216 stores pre-processed data 226 in strategic and tactical segmentation planner database 114 pre-processed data 226.

At activity 408 of strategic segment generation method 400, segmentation module 218 performs multi-dimension segmentation on pre-processed data 226 and computes feature importance to generate segments. Segmentation module 218 may access pre-processed data 226 and perform the activities of a comprehensive segment analysis method 500, described in greater detail below and illustrated by FIG. 5, to generate segments. In a comprehensive scenario embodiment in which segmentation module 218 uses all data available and a more extensive computation time, segmentation module 218 may access pre-processed data 226 and utilize all pre-processed data 226 to generate segments, as described in greater detail below. In other embodiments in which an agile scenario with a reduced computation requirement uses a representative sample of available data to generate segments, segmentation module 218 accesses a portion of the full data set stored in input data 220 and/or pre-processed data 226, and uses the portion of the full data set as a representative sample from which to (1) train a machine learning model to generate segmentation output and (2) predict remaining segments using the trained segmentation output, while also (3) utilizing the trained machine learning model to predict tactical segments using tactical segment prediction method 700, described in greater detail in reference to FIGS. 6 and 7 below. Having generated one or more segments, segmentation module 218 stores the one or more segments in strategic segmentation data 228.

At activity 410 of strategic segment generation method 400, user interface module 210 visualizes segment output. User interface module 210 accesses strategic segmentation data 228 and generates one or more GUI displays, suitable for output on one or more computer 150 output devices, to visualize the segment output.

At activity 412 of strategic segment generation method 400, user interface module 210 assigns policy parameters to strategic segmentation data 228. In an embodiment, user interface module 210 responds to input to one or more computer input devices 152, and assigns one or more policy parameters to one or more segments stored in strategic segmentation data 228. By way of example and not by way of limitation, policy parameters may comprise assigning service levels of 90%, 95%, 99%, or any other level to one or more segments.

At activity 414 of strategic segment generation method 400, data processing module 216 trains one or more machine learning models and/or other algorithms to predict the tactical segmentation of new data and/or to predict segment intersections, based on the generated segments stored in strategic segmentation data 228. In an embodiment, data processing module 216 uses a cyclic boosting process to train one or more machine learning models and/or other algorithms; in other embodiments, data processing module 216 utilizes any machine learning training processing, including but not limited to a deep learning process and/or a neural network, to train the one or more machine learning models and/or other algorithms. Data processing module 216 stores the one or more trained machine learning models and/or algorithms in machine learning models data 240. In an embodiment in which strategic and tactical segmentation planner 110 selected an agile scenario in which to execute the activities of strategic segment generation method 400, segmentation module 218 may access the one or more machine learning models and/or algorithms stored in machine learning models data 240 and may use the one or more machine learning models and/or algorithms to predict additional segments, segment intersections, and/or other segmentation data for the full data set available in input data 220, and may store the segments, segment intersections, and/or other segmentation data in strategic segmentation data 228. Having trained one or more machine learning models and/or algorithms, strategic and tactical segmentation planner 110 terminates strategic segment generation method 400.

Figure 5:
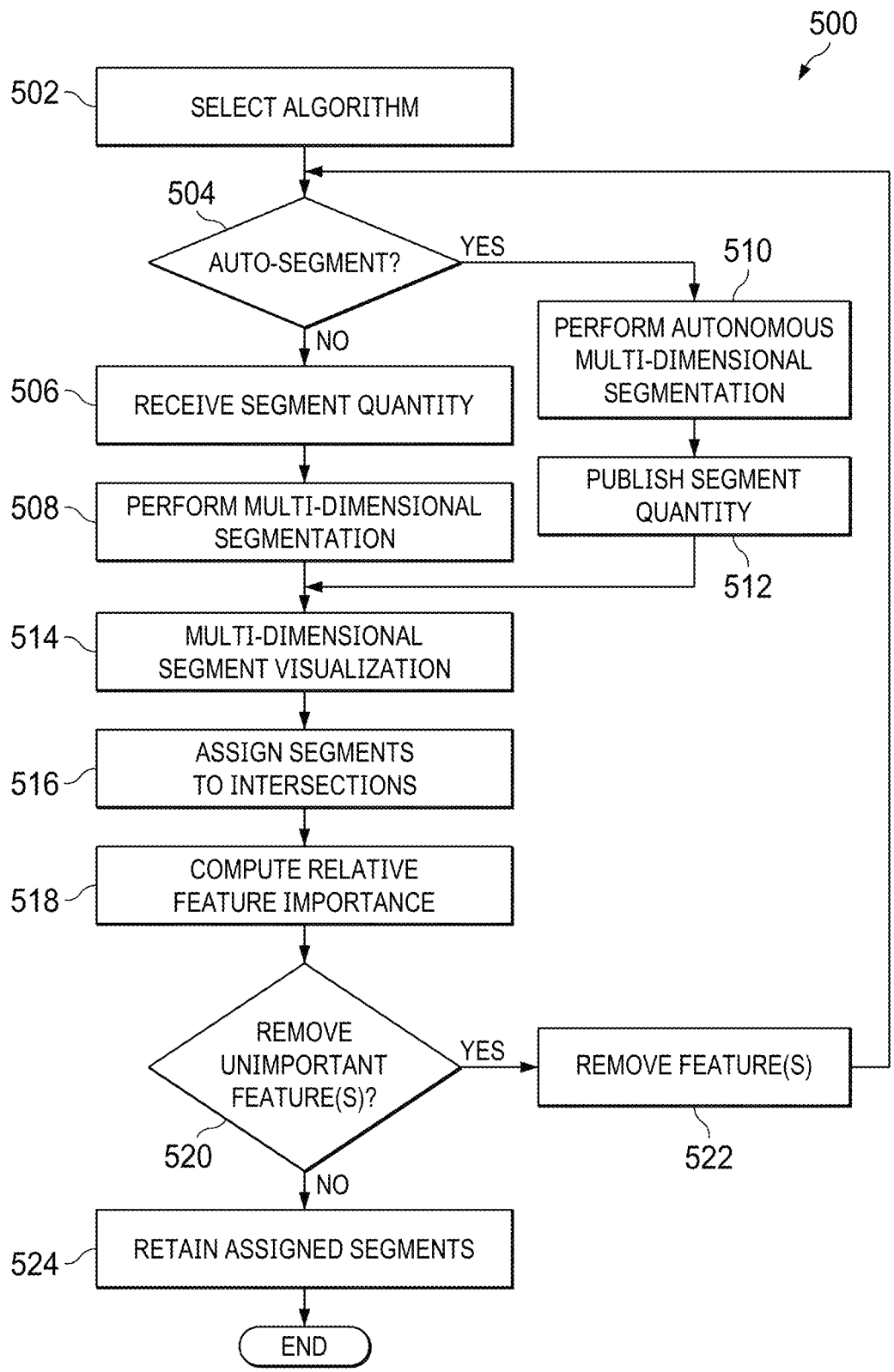
FIG. 5 illustrates an exemplary comprehensive segment analysis method, according to an embodiment.

FIG. 5 illustrates exemplary comprehensive segment analysis method 500 in which strategic and tactical segmentation planner 110 analyzes segments in a comprehensive scenario, according to an embodiment. The following comprehensive segment analysis method 500 proceeds by one or more activities, which although described in a particular order may be performed in one or more permutations, combinations, orders, or repetitions, according to particular needs.

At activity 502 of comprehensive segment analysis method 500, segmentation module 218 selects an algorithm with which to perform auto-segmentation at activity 504 of comprehensive segment analysis method 500. In an embodiment, segmentation module 218 accesses algorithms data 232, and selects an algorithm from a selection of one or more algorithms stored in algorithms data 232, to perform auto-segmentation. According to embodiments, segmentation module 218 may select an algorithm based on whether the data stored in pre-processed data 226 is string-based or numerical-based. In other embodiments, user interface module 210 may respond to input made to one or more computer input devices 152, and may directly select an algorithm from a selection of one or more algorithms stored in algorithms data 232.

At activity 504 of comprehensive segment analysis method 500, segmentation module 218 determines whether to proceed to activity 506 of comprehensive segment analysis method 500 and receive a specified number of segments from user interface module 210, or to proceed to activity 510 of comprehensive segment analysis method 500 and perform autonomous multi-dimensional segmentation, including but not limited to computing a number of segments autonomously. Segmentation module 218 may respond to input from user interface module 210, including but not limited to input to one or more computer input devices 152 detected by user interface module 210, to determine whether to proceed to activity 506 or activity 510 of comprehensive segment analysis method 500.

At activity 506 of comprehensive segment analysis method 500, segmentation module 218 receives a specified number of segments from user interface module 210. In an embodiment, user interface module 210 detects input to one or more computer input devices 152 that specifies a given quantity of segments (such as, for example, ten, twenty, fifty, or any other number). User interface module 210 transmits the specified number of segments to segmentation module 218. Segmentation module 218 stores the specified number of segments in number of segments data 234, and proceeds to activity 508 of comprehensive segment analysis method 500 to perform multi-dimensional segmentation.

At activity 508 of comprehensive segment analysis method 500, segmentation module 218 performs multi-dimensional segmentation. Segmentation module 218 accesses number of segments data 234 and generates an initial segmentation configuration using the number of segments stored in number of segments data 234. Segmentation module 218 stores the initial segmentation configuration in initial segmentation configuration data 236, and proceeds to activity 514 of comprehensive segment analysis method 500 to perform multi-dimensional segment visualization.

In other embodiments in which segmentation module 218 does not receive a specified number of segments from user interface module 210, segmentation module 218 proceeds from activity 504 of comprehensive segment analysis method 500 to activity 510 of comprehensive segment analysis method 500 and performs autonomous multi-dimensional segmentation. According to embodiments, segmentation module 218 may use any method or process to perform autonomous multi-dimensional segmentation and compute a number of segments autonomously, including but not limited to an artificial intelligence (AI) or machine learning (ML) segmentation with autonomous selection of features. Having autonomously computed a number of segments, segmentation module 218 stores the number of segments in number of segments data 234. Segmentation module 218 may generate an initial segmentation configuration using the number of segments stored in number of segments data 234. Segmentation module 218 stores the initial segmentation configuration in initial segmentation configuration data 236, and proceeds to activity 512 of comprehensive segment analysis method 500.

At activity 512 of comprehensive segment analysis method 500, strategic and tactical segmentation planner 110 publishes the number of segments that were computed during activity 510 of comprehensive segment analysis method 500. According to embodiments, user interface module 210 may access the number of segments stored in number of segments data 234, and may generate one or more GUI displays visualizing the number of segments stored in number of segments data 234. Strategic and tactical segmentation planner 110 proceeds to activity 514 of comprehensive segment analysis method 500 to perform multi-dimensional segment visualization.

At activity 514 of comprehensive segment analysis method 500, segmentation module 218 and user interface module 210 perform multi-dimensional segment visualization. User interface module 210 accesses the initial segmentation configuration stored in initial segmentation configuration data 236, and generates a GUI display visualizing the initial segmentation configuration.

At activity 516 of comprehensive segment analysis method 500, segmentation module 218 assigns segments to intersections. In an embodiment, segmentation module 218 accesses initial segmentation configuration data 236 and pre-processed data 226, and assigns segments from initial segmentation configuration data 236 to item and/or product intersections, as well as one or more features, stored in pre-processed data 226. Segmentation module 218 stores the assigned segments from initial segmentation configuration data 236 in assigned segments data 238 of strategic and tactical segmentation planner database 114.

At activity 518 of comprehensive segment analysis method 500, segmentation module 218 computes the relative importance of one or more features stored in assigned segments data 238. According to embodiments, segmentation module 218 may use one or more of any algorithms or processes to compute the relative importance of one or more features stored in assigned segments data 238, including but not limited to a boundary analysis of how each feature participates in interacting with one or more segments. Segmentation module 218 computes a relative importance score for each of the one or more features stored in assigned segments data 238. Segmentation module 218 stores the relative importance score for each feature associated with each feature in assigned segments data 238.

At activity 520 of comprehensive segment analysis method 500, segmentation module 218 determines whether to proceed to activity 522 of comprehensive segment analysis method 500 and drop one or more unimportant features, or to proceed to activity 524 of comprehensive segment analysis method 500 and retain assigned segments, features, and intersections. In an embodiment, user interface module 210 may generate a GUI display to visualize one or more relative importance scores for one or more features. Segmentation module 218 may respond to input from user interface module 210, including but not limited to input to one or more computer input devices 152 detected by user interface module 210, to determine whether to proceed to activity 522 or activity 524 of comprehensive segment analysis method 500.

At activity 522 of comprehensive segment analysis method 500, segmentation module 218 drops one or more features. According to embodiments, segmentation module 218 may access the segments, features, intersections, and feature relative importance scores stored in assigned segments data 238. Segmentation module 218 may drop one or more features associated with relative importance scores lower than a defined threshold. Having dropped one or more features, segmentation module 218 may return to activity 504 of comprehensive segment analysis method 500, and continue the activities described above.

At activity 524 of comprehensive segment analysis method 500, segmentation module 218 retains the assigned segments, features, and intersections. Segmentation module 218 accesses the assigned segments, features, and intersections stored in assigned segments data 238, and stores data associated with the assigned segments, features, and intersections in strategic segmentation data 228. Segmentation module 218 then terminates comprehensive segment analysis method 500.

Figure 6:
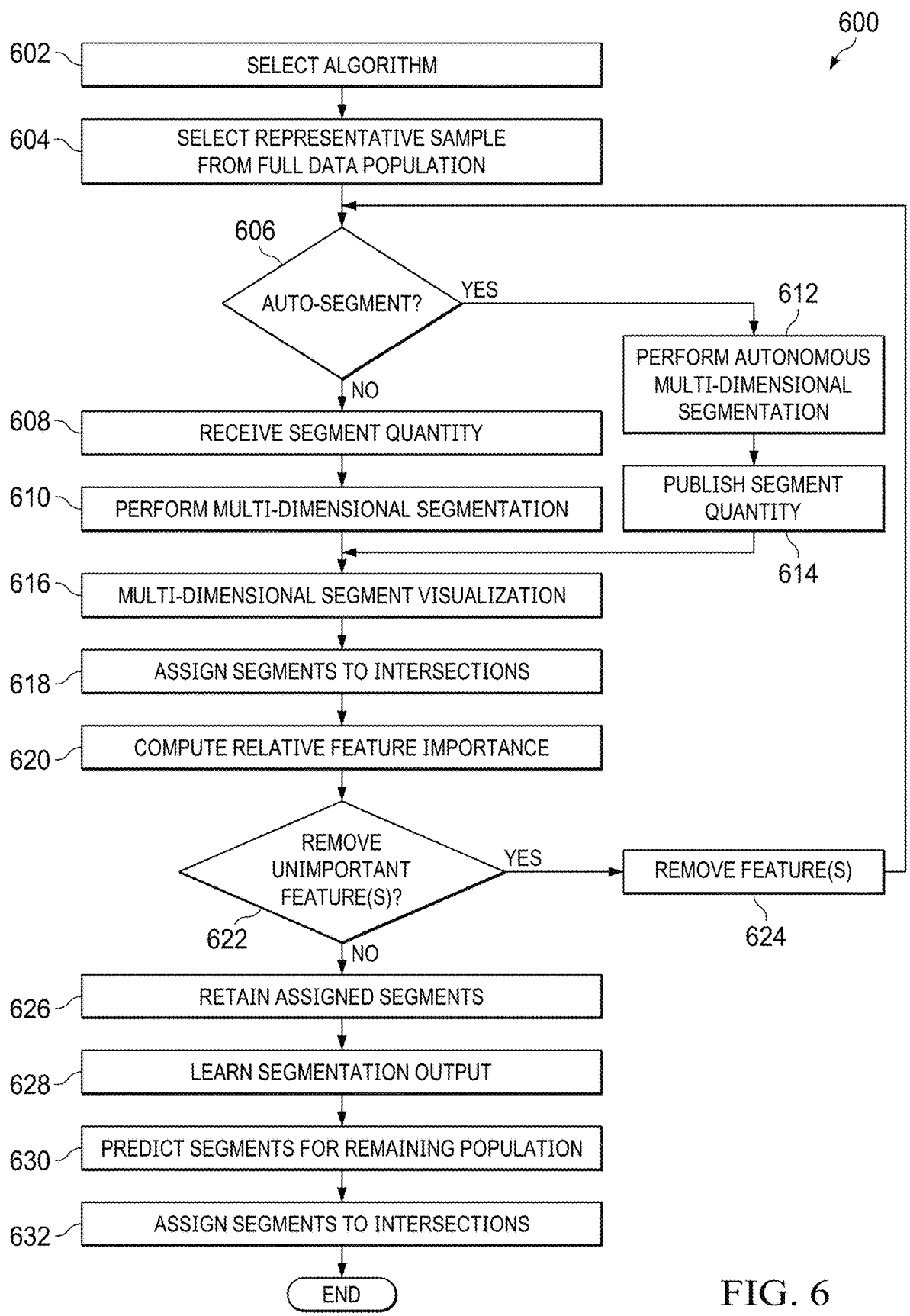
FIG. 6 illustrates an exemplary agile segment analysis method, according to an embodiment.

FIG. 6 illustrates exemplary agile segment analysis method 600 in which strategic and tactical segmentation planner 110 analyzes segments in an agile scenario, according to an embodiment. The following agile segment analysis method 600 proceeds by one or more activities, which although described in a particular order may be performed in one or more permutations, combinations, orders, or repetitions, according to particular needs.

At activity 602 of agile segment analysis method 600, segmentation module 218 selects an algorithm with which to perform auto-segmentation at activity 606 of agile segment analysis method 600. In an embodiment, segmentation module 218 accesses algorithms data 232, and selects an algorithm from a selection of one or more algorithms stored in algorithms data 232, to perform auto-segmentation. According to embodiments, segmentation module 218 may select an algorithm based on whether the data stored in pre-processed data 226 is string-based or numerical-based, with some algorithms tailored for use with string-based data and other algorithms tailored for use with numerical-based data. In other embodiments, user interface module 210 may respond to input made to one or more computer input devices 152, and may directly select an algorithm from a selection of one or more algorithms stored in algorithms data 232.

At activity 604 of agile segment analysis method 600, segmentation module 218 selects a representative sample from the full data population on which to perform the subsequent activities of agile segment analysis method 600. At activity 606 of agile segment analysis method 600, segmentation module 218 determines whether to proceed to activity 608 of agile segment analysis method 600 and receive a specified number of segments from user interface module 210, or to proceed to activity 612 of agile segment analysis method 600 and perform autonomous multi-dimensional segmentation, including but not limited to computing a number of segments autonomously. Segmentation module 218 may respond to input from user interface module 210, including but not limited to input to one or more computer input devices 152 detected by user interface module 210, to determine whether to proceed to activity 608 or activity 612 of agile segment analysis method 600.

At activity 608 of agile segment analysis method 600, segmentation module 218 receives a specified number of segments from user interface module 210. In an embodiment, user interface module 210 detects input to one or more computer input devices 152 that specifies a given quantity of segments (such as, for example, ten, twenty, fifty, or any other number). User interface module 210 transmits the specified number of segments to segmentation module 218. Segmentation module 218 stores the specified number of segments in number of segments data 234, and proceeds to activity 610 of agile segment analysis method 600 to perform multi-dimensional segmentation.

At activity 610 of agile segment analysis method 600, segmentation module 218 performs multi-dimensional segmentation. Segmentation module 218 accesses number of segments data 234 and generates an initial segmentation configuration using the number of segments stored in number of segments data 234. Segmentation module 218 stores the initial segmentation configuration in initial segmentation configuration data 236, and proceeds to activity 618 of agile segment analysis method 600 to perform multi-dimensional segment visualization.

In other embodiments in which segmentation module 218 does not receive a specified number of segments from user interface module 210, segmentation module 218 proceeds from activity 606 of agile segment analysis method 600 to activity 612 of agile segment analysis method 600 and performs autonomous multi-dimensional segmentation. According to embodiments, segmentation module 218 may use any method or process to perform autonomous multi-dimensional segmentation and compute a number of segments autonomously, including but not limited to an artificial intelligence (AI) or machine learning (ML) segmentation with autonomous selection of features. Having autonomously computed a number of segments, segmentation module 218 stores the number of segments in number of segments data 234. Segmentation module 218 may generate an initial segmentation configuration using the number of segments stored in number of segments data 234. Segmentation module 218 stores the initial segmentation configuration in initial segmentation configuration data 236, and proceeds to activity 614 of agile segment analysis method 600.

At activity 614 of agile segment analysis method 600, strategic and tactical segmentation planner 110 publishes the number of segments that were computed during activity 612 of agile segment analysis method 600. According to embodiments, user interface module 210 may access the number of segments stored in number of segments data 234, and may generate one or more GUI displays visualizing the number of segments stored in number of segments data 234. Strategic and tactical segmentation planner 110 proceeds to activity 616 of agile segment analysis method 600 to perform multi-dimensional segment visualization.

At activity 616 of agile segment analysis method 600, segmentation module 218 and user interface module 210 perform multi-dimensional segment visualization. User interface module 210 accesses the initial segmentation configuration stored in initial segmentation configuration data 236, and generates a GUI display visualizing the initial segmentation configuration.

At activity 618 of agile segment analysis method 600, segmentation module 218 assigns segments to intersections. In an embodiment, segmentation module 218 accesses initial segmentation configuration data 236 and pre-processed data 226, and assigns segments from initial segmentation configuration data 236 to item and/or product intersections, as well as one or more features, stored in pre-processed data 226. Segmentation module 218 stores the assigned segments from initial segmentation configuration data 236 in assigned segments data 238 of strategic and tactical segmentation planner database 114.

At activity 620 of agile segment analysis method 600, segmentation module 218 computes the relative importance of one or more features stored in assigned segments data 238. According to embodiments, segmentation module 218 may use one or more of any algorithms or processes to compute the relative importance of one or more features stored in assigned segments data 238, including but not limited to a boundary analysis of how each feature participates in interacting with one or more segments. Segmentation module 218 computes a relative importance score for each of the one or more features stored in assigned segments data 238. Segmentation module 218 stores the relative importance score for each feature associated with each feature in assigned segments data 238.

At activity 622 of agile segment analysis method 600, segmentation module 218 determines whether to proceed to activity 624 of agile segment analysis method 600 and drop one or more unimportant features, or to proceed to activity 626 of agile segment analysis method 600 and retain assigned segments, features, and intersections. In an embodiment, user interface module 210 may generate a GUI display to visualize one or more relative importance scores for one or more features. Segmentation module 218 may respond to input from user interface module 210, including but not limited to input to one or more computer input devices 152 detected by user interface module 210, to determine whether to proceed to activity 624 or activity 626 of agile segment analysis method 600.

At activity 624 of agile segment analysis method 600, segmentation module 218 drops one or more features. According to embodiments, segmentation module 218 may access the segments, features, intersections, and feature relative importance scores stored in assigned segments data 238. Segmentation module 218 may drop one or more features associated with relative importance scores lower than a defined threshold. Having dropped one or more features, segmentation module 218 may return to activity 606 of agile segment analysis method 600, and continue the activities described above.

At activity 626 of agile segment analysis method 600, segmentation module 218 retains the assigned segments, features, and intersections. Segmentation module 218 accesses the assigned segments, features, and intersections stored in assigned segments data 238, and stores data associated with the assigned segments, features, and intersections in strategic segmentation data 228.

At activity 628 of agile segment analysis method 600, data processing module 216 trains one or more supervised machine learning models using the initial segment configuration stored in initial segmentation configuration data 236. In an embodiment, data processing module 216 trains one or more supervised machine learning models using a sample portion of data stored in input data 220, pre-processed data 226, and/or initial segmentation configuration data 236, stores the one or more supervised machine learning models in machine learning models data 240, and proceeds to activity 630 of agile segment analysis method 600.

At activity 630 of agile segment analysis method 600, segmentation module 218 predicts segments for one or more remaining segment intersections using the one or more supervised machine learning models. Segmentation module 218 accesses one or more supervised machine learning models stored in machine learning models data 240, and applies input data 220, pre-processed data 226, and/or initial segment configuration data to the one or more supervised machine learning models to predict segments for one or more remaining segment intersections that did not previously receive assigned segments. Segmentation module 218 stores the predicted segments in initial segmentation configuration data 236. In an embodiment, segmentation module 218 may subsequently use the one or more supervised machine learning models to predict tactical segments while executing activity 706 of tactical segment prediction method 700, described in greater detail below.

At activity 632 of agile segment analysis method 600, segmentation module 218 assigns predicted segments, generated at activity 630 of agile segment analysis method 600, to intersections. In an embodiment, segmentation module 218 accesses the predicted segments in initial segmentation configuration data 236, and assigns predicted segments from initial segmentation configuration data 236 to item and/or product intersections, as well as one or more features, stored in pre-processed data 226. Segmentation module 218 stores the assigned segments from initial segmentation configuration data 236 in assigned segments data 238 of strategic and tactical segmentation planner database 114, and terminates agile segment analysis method 600.

Figure 7:
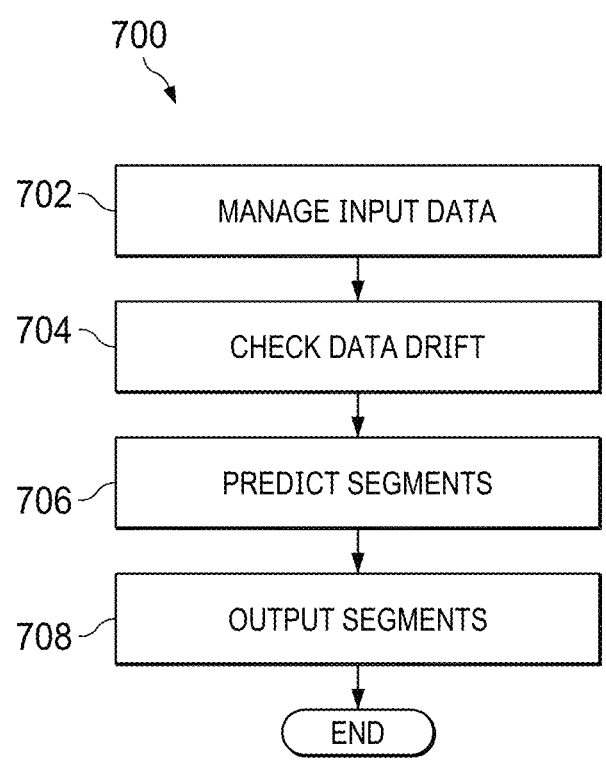
FIG. 7 illustrates a tactical segment prediction method, according to an embodiment.

FIG. 7 illustrates tactical segment prediction method 700, according to an embodiment. The following tactical segment prediction method 700 proceeds by one or more activities, which although described in a particular order may be performed in one or more permutations, combinations, orders, or repetitions, according to particular needs.

At activity 702 of tactical segment prediction method 700, data management module 212 manages input data 220 and generates cleansed data 222. Data management module 212 accesses input data 220 stored in strategic and tactical segmentation planner database 114, which may, in an embodiment, comprise new data, updated data, or data that is otherwise different, more recent, or more up-to-date than input data 220 previously used during strategic segment generation method 400. In an embodiment, data management module 212 determines segment intersections based on input data 220. Data management module 212 may also transform input data 220 to generate cleansed data 222. Data transformation may comprise converting input data 220 from one data storage format into another data storage format; copying one or more pre-discovered features stored in input data 220 into cleansed data 222; removing one or more pre-discovered features stored in input data 220; and/or any other data modification or cleansing actions. Having generated cleansed data 222, data management module 212 stores cleansed data 222 in strategic and tactical segmentation planner database 114 cleansed data 222.

At activity 704 of tactical segment prediction method 700, data management module 212 checks cleansed data 222 for data drift. In an embodiment, data management module 212 checks cleansed data 222 for data drift by executing activity 306 of segmentation workflow method 300, described in greater detail above, to compare a first segment, subset, or portion of cleansed data 222 to a second segment, subset, or portion of cleansed data 222 and/or input data 220 to determine if the first segment, subset or portion has drifted far enough from the second segment, subset or portion as to require the generation of updated strategic segments. In other embodiments, data management module 212 may use any method to check any data for data drift, according to particular needs. If data management module 212 determines that significant data drift has occurred, data management module 212 terminates the activities of tactical segment prediction method 700 and strategic and tactical segmentation planner 110 returns to activity 302 of segmentation workflow method 300 to generate updated strategic segments. However, if data management module 212 determines that no significant drift has occurred, strategic and tactical segmentation planner 110 proceeds to activity 706 of tactical segment prediction method 700.

At activity 706 of tactical segment prediction method 700, segmentation module 218 predicts tactical segments. In an embodiment, segmentation module 218 accesses cleansed data 222, as well as one or more machine learning models and/or algorithms stored in machine learning models data 240. Segmentation module 218 uses the one or more machine learning models and/or algorithms to predict one or more tactical segments, tactical segmentation predictions, tactical segment intersections, and/or other tactical segmentation data 230. In an agile scenario embodiment, segmentation module 218 may use one or more supervised machine learning models, previously trained by data processing module 216 during the activities of agile segment analysis method 600, to predict tactical segments.

At activity 708 of tactical segment prediction method 700, segmentation module 218 stores the one or more tactical segments, tactical segmentation predictions, tactical segment intersections, and/or other tactical segmentation data 230 in tactical segmentation data 230 of the strategic and technical segmentation planner database 114, and outputs the one or more tactical segments, tactical segmentation predictions, tactical segment intersections, and/or other tactical segmentation data 230 for use throughout supply chain network 100. As compared to the frequency at which the strategic and technical segmentation planner may generate strategic segments using strategic segment generation method 400, the strategic and technical segmentation planner may generate and output tactical segmentation predictions more frequently (such as, in an embodiment, generating tactical segmentation predictions daily or weekly). Strategic and tactical segmentation planner 110 may then terminate the activities of tactical segment prediction method 700.

To illustrate the operation of strategic and tactical segmentation planner 110 executing the activities of strategic segment generation method 400, comprehensive segment analysis method 500, and tactical segment prediction method 700, the following example is provided. In this example, strategic and tactical segmentation planner 110 accesses input data 220 and generates, at the strategic level on Dec. 1, 2019, five segments 804a-804e for input data 220 comprising four features (Orders; Forecast Volume; Average Demand Interval (ADI), which represents the number of months in a year, from 1 to 12, in which an item is ordered; and Coefficient of Variation (COV), which represents the volatility of demand for each item sold). In this example, strategic and tactical segmentation planner 110 then executes the activities of tactical segment prediction method 700 once a day, beginning on Dec. 2, 2019, to predict tactical segments for updated input data 220 without requiring the full re-generation of new strategic segments. Although a particular example of strategic and tactical segmentation planner 110 generating strategic segments and tactical segment predictions is provided herein, embodiments contemplate strategic and tactical segmentation planner 110 implementing the activities of strategic segment generation method 400, comprehensive segment analysis method 500, and/or tactical segment prediction method 700, in any order and with respect to any input data 220, features, intersections, or other circumstances, according to particular needs.

In this example, at activity 402 of strategic segment generation method 400, data management module 212 selects a segmentation workflow depth, manages input data 220, and generates cleansed data 222. Data management module 212 responds to input detected by user interface module 210 to select a comprehensive scenario utilizing all available input data 220 on Dec. 1, 2019. Data management module 212 accesses input data 220 stored in strategic and tactical segmentation planner database 114. In this example, input data 220 comprises Orders data, Forecast Volume data, ADI data, and COV data for a collection of products sold in and transported throughout a supply chain network 100. Data management module 212 generates cleansed data 222 in a single data storage format and stores cleansed data 222 in strategic and tactical segmentation planner database 114.

Continuing the example, at activity 404 of strategic segment generation method 400, features module 214 discovers features. Features module 214 accesses cleansed data 222 and discovers features in cleansed data 222 to generate features data 224. In this example, features module 214 discovers four features: Orders, Forecast Volume, ADI, and COV.

Continuing the example, at activity 406 of strategic segment generation method 400, data processing module 216 pre-processes features data 224 to generate pre-processed data 226. At activity 408 of strategic segment generation method 400, segmentation module 218 performs multi-dimension segmentation on pre-processed data 226 and computes feature importance to generate segments. In this example, segmentation module 218 accesses pre-processed data 226 and performs comprehensive segment analysis method 500 described above to generate segments. Segmentation module 218 begins activity 502 of comprehensive segment analysis method 500 and selects an algorithm with which to perform auto-segmentation at activity 504 of comprehensive segment analysis method 500. In this example, pre-processed data 226 is numerical-based, and segmentation module 218 selects a numerical-based algorithm with which to perform auto-segmentation.

Continuing the example, at activity 504 of comprehensive segment analysis method 500, segmentation module 218 determines that user interface module 210 has not specified a number of segments to use during comprehensive segment analysis method 500. Segmentation module 218 moves to activity 510 of comprehensive segment analysis method 500 and performs autonomous multi-dimensional segmentation. Segmentation module 218 autonomously computes a number of segments. In the embodiment illustrated in this example, segmentation module 218 chooses, and stores in number of segments data 234, five segments 804a-804e at activity 510 of comprehensive segment analysis method 500. Segmentation module 218 accesses number of segments data 234 and generates an initial segmentation configuration using five segments 804a-804e stored in number of segments data 234. Segmentation module 218 stores the initial segmentation configuration in initial segmentation configuration data 236, and proceeds to activity 512 of comprehensive segment analysis method 500. At activity 512 of comprehensive segment analysis method 500, strategic and tactical segmentation planner 110 publishes the number of segments that were computed during activity 510 of comprehensive segment analysis method 500, and proceeds to activity 514 of comprehensive segment analysis method 500.

Continuing the example, at activity 514 of comprehensive segment analysis method 500, segmentation module 218 and user interface module 210 perform multi-dimensional segment visualization. User interface module 210 accesses the initial segmentation configuration stored in initial segmentation configuration data 236, and generates an initial segment configuration display 800 visualizing the initial segmentation configuration.

Figure 8:
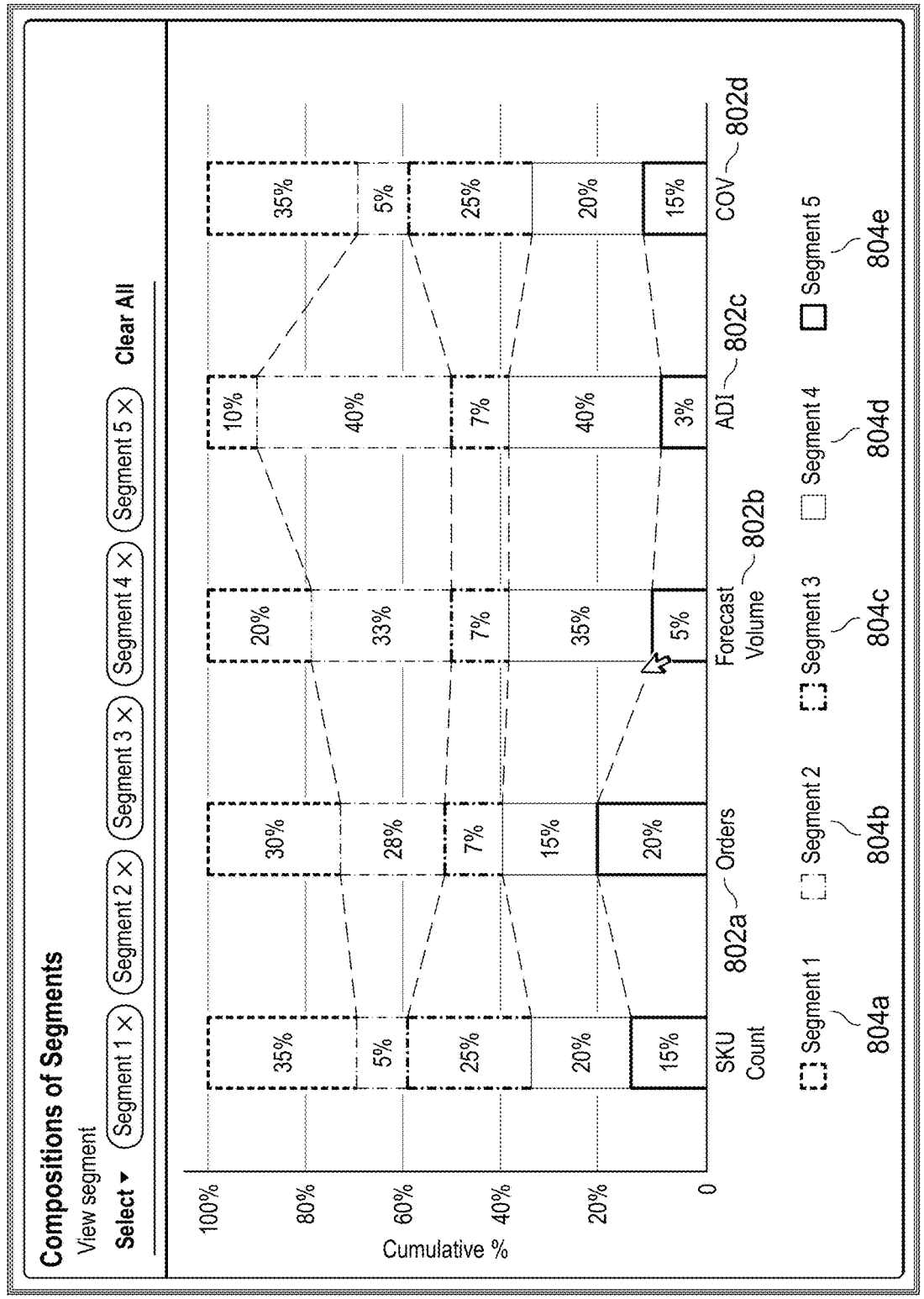
FIG. 8 illustrates an initial segment configuration display, according to an embodiment.

FIG. 8 illustrates initial segment configuration display 800, according to an embodiment. Initial segment configuration display 800 may display for visualization one or more segments and one or more features, according to embodiments. Although particular examples of initial segment configuration displays 800 are illustrated and described herein, embodiments contemplate user interface module 210 generating initial segment configuration displays 800 in any configuration and displaying any data, according to particular needs.

Continuing the example, initial segment configuration display 800 illustrates five segments 804A-804E chosen by segmentation module 218 with respect to each segment's relationship to each of Orders 802A, Forecast Volume 802B, Average Demand Interval (ADI) 802C, and Coefficient of Variation (COV) 802D with respect to the number of SKUs in each segment (SKU Count). ADI indicates the frequency of placing orders in a year for a specific item at a specific location, indexed by a number of months in which an order in placed for an item, that is, from 0 (months) to 12 (months). COV indicates the volatility in demand for a specific item. In an embodiment, COV varies from 0 to 1.

As illustrated in FIG. 8, segment 1 804A, for example, includes 35% of SKUs across all segments, but only 30% of all orders 802A, 20 of forecast volume 802B, 10 of ADI 802C, but 35% of COV 802D. Similarly, each of segment 804B-804D show varying levels across measures Orders 802A, Forecast Volume 802B, ADI 802C, and COV 802D.

At activity 516 of comprehensive segment analysis method 500, segmentation module 218 assigns segments to intersections and features. Segmentation module 218 accesses initial segmentation configuration data 236 and pre-processed data 226, and assigns segments from initial segmentation configuration data 236 to item and/or product intersections, as well as one or more features, stored in pre-processed data 226. Segmentation module 218 stores the assigned segments from initial segmentation configuration data 236 in assigned segments data 238 of strategic and tactical segmentation planner database 114.

Continuing the example, at activity 518 of comprehensive segment analysis method 500, segmentation module 218 computes the relative importance of one or more features stored in assigned segments data 238. Segmentation module 218 stores the relative importance score for each feature in assigned segments data 238. At activity 520 of comprehensive segment analysis method 500, segmentation module 218 determines that all features are important, and proceeds to activity 524 of comprehensive segment analysis method 500. Segmentation module 218 retains the assigned segments, features, and intersections, and stores data associated with the assigned segments, features, and intersections in strategic segmentation data 228. Segmentation module 218 then terminates comprehensive segment analysis method 500.

Continuing the example, at activity 410 of strategic segment generation method 400, user interface module 210 visualizes segment output. User interface module 210 accesses strategic segmentation data 228 and generates one or more GUI displays, suitable for output on one or more computer 150 output devices, to visualize the segment output. At activity 412 of strategic segment generation method 400, user interface module 210 assigns policy parameters to strategic segmentation data 228. At activity 414 of strategic segment generation method 400, data processing module 216 trains a machine learning models (henceforth, "Model X") to predict the tactical segmentation of new data based on the generated segments stored in strategic segmentation data 228.

Continuing the example, at activity 702 of tactical segment prediction method 700, on Dec. 2, 2019, data management module 212 manages input data 220 and generates cleansed data 222. Data management module 212 accesses input data 220 stored in strategic and tactical segmentation planner database 114, which in this example contains updated data to reflect data accumulated and uploaded to input data 220 on Dec. 2, 2019. Data management module 212 transforms the Dec. 2, 2019 input data to generate Dec. 2, 2019 cleansed data. Data management module 212 stores the Dec. 2, 2019 cleansed data in strategic and tactical segmentation planner database 114 cleansed data 222.

Continuing the example, at activity 704 of tactical segment prediction method 700, data management module 212 checks the Dec. 2, 2019 cleansed data for data drift. In this example, data management module 212 checks the Dec. 2, 2019 cleansed data for data drift by comparing the Dec. 2, 2019 cleansed data to input data 220 available on Dec. 1, 2019 to determine if the Dec. 2, 2019 cleansed data has drifted far enough from the Dec. 1, 2019 input data so as to require the generation of updated strategic segments. In this example, data management module 212 determines that minimal data drift has occurred, and strategic and tactical segmentation planner 110 proceeds to activity 706 of tactical segment prediction method 700.

Continuing the example, at activity 706 of tactical segment prediction method 700, segmentation module 218 predicts tactical segments for the Dec. 2, 2019 cleansed data. Segmentation module 218 accesses the Dec. 2, 2019 cleansed data and Model X stored in machine learning models data 240. In this example, segmentation module 218 uses Model X to predict tactical segments and tactical segment intersections related to the Dec. 2, 2019 cleansed data.

Continuing the example, at activity 708 of tactical segment prediction method 700, segmentation module 218 stores the predicted tactical segments and tactical segment intersections relating to the Dec. 2, 2019 cleansed data in tactical segmentation data 230. In this example, strategic and tactical segmentation planner 110 continues to execute the activities of tactical segment prediction method 700 on a daily basis (beginning with Dec. 3, 2019, and continuing daily thereafter) to predict tactical segments and tactical segment intersections for the up-to-date cleansed data. In this example, this methodology continues until Jan. 1, 2020, on which day data management module 212 determines, at activity 704 of tactical segment prediction method 700, that significant data drift has occurred between the Jan. 1, 2020 cleansed data and the Dec. 1, 2019 input data. In this example, user interface module 210 accesses input data 220 and cleansed data 222, and generates data drift display 900, illustrated by FIG. 9, to visualize the data drift between the Dec. 1, 2019 input data and the Jan. 1, 2020 cleansed data.

Figure 9:
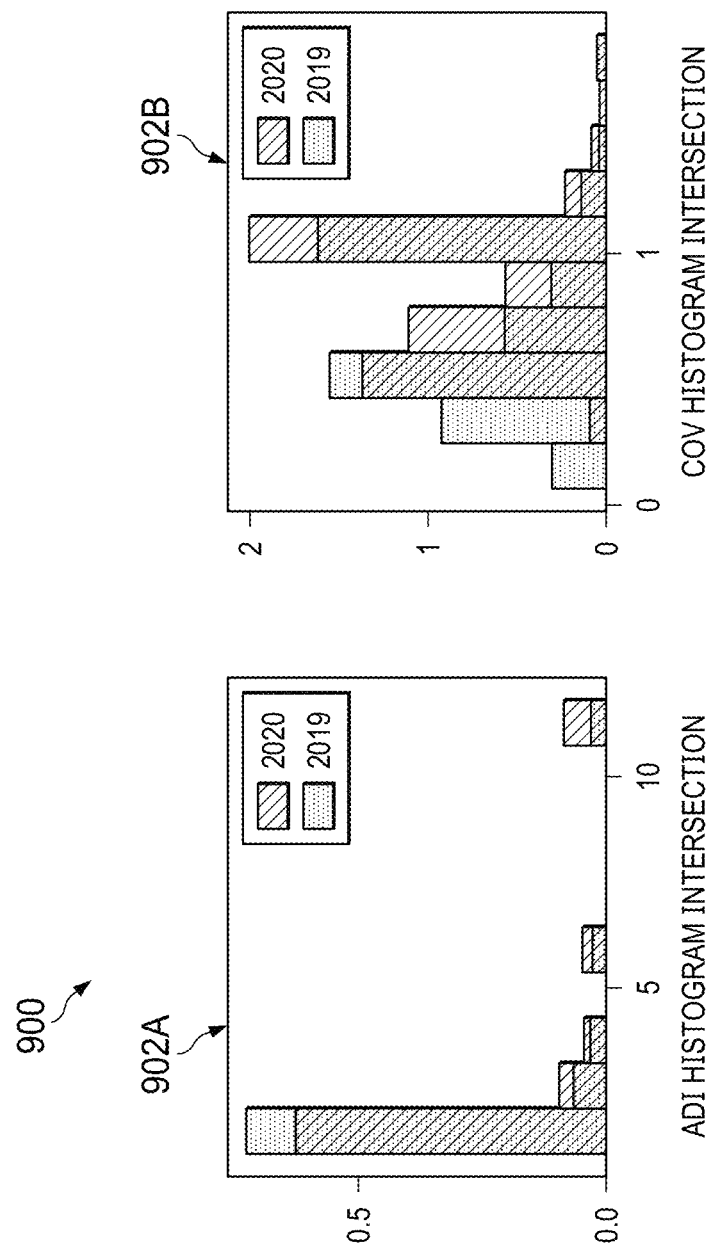
FIG. 9 illustrates an exemplary data drift display, according to an embodiment.

FIG. 9 illustrates exemplary data drift display 900, according to an embodiment. Data drift display 900 comprises histograms of intersections 902A and 902B for the ADI and COV features from Dec. 1, 2019 to Jan. 1, 2020. Although FIG. 9 illustrates data drift display 900 in a particular configuration, embodiments contemplate strategic and tactical segmentation planner 110 generating and displaying data drift displays 900 in any configuration and displaying any database data, according to particular needs.

In this embodiment, strategic and tactical segmentation planner 110 has performed a drift analysis and determined that ADI and COV are the most important features over the relevant data set. The data drift analysis indicates that the ADI and COV features have experienced significant drift from the 2019 dataset to the 2020 dataset. In this embodiment, and as shown in FIG. 9, monthly demand, order quantities and order lines distributions remain similar. In general, if a drift analysis indicates that data drift has occurred, a strategic segmentation run may be appropriate. The example shown in FIG. 9 shows a strong data drift has occurred, indicating that a strategic, rather than tactical, segmentation run is appropriate for the dataset shown in FIG. 9. If a data drift analysis showed there was little or no data drift, a more light-weight tactical segmentation run could instead be performed.

Concluding the example, data management module 212 determines that significant data drift has occurred, terminates the activities of tactical segment prediction method 700, and strategic and tactical segmentation planner 110 returns to activity 302 of segmentation workflow method 300 to generate updated strategic segments and continue the activities described above.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for performing tactical segmentation, comprising:
a supply chain network comprising a tactical segmentation planner, an inventory system, a transportation network and one or more supply chain entities, the strategic segmentation planner further comprising a computer and a database, the computer comprising a memory and a processor, the computer configured to autonomously:
perform multi-dimension segmentation on input data by computing feature importance to generate multi-dimensional segments;
assign policy parameters to the supply chain network based on the generated multi-dimensional segments;
train a machine learning model by applying a cyclic boosting process to the standardized features data, wherein the cyclic boosting process iteratively learns relationships associated with the generated multi-dimensional segments;
store the machine learning model in the database;
perform multi-dimension segmentation based on the stored machine learning model;
determine whether data drift has occurred in the input data; and
in response to determining that data drift has occurred, repeat the perform, assign, and train steps, and store an updated machine learning model in the database.

2. The system of claim 1, wherein the computer is further configured to:
assign policy parameters to the supply chain network comprising one or more parameters selected from a group consisting of: a minimum order quantity, a maximum order quantity, a discount, a step-size order quantity, and batch quantity rules.

3. The system of claim 1, wherein the computer is further configured to:
cleanse the input data by:
converting the input data from one data storage format into another data storage format;
copying one or more pre-discovered features stored in the input data into cleansed data; or
removing one or more pre-discovered features stored in the input data.

4. The system of claim 2, wherein the input data further comprises:
data relating to supply chain entities, supply chain plans, transactions, shipments between supply chain entities, past sales, past demand, purchase data, promotions or events of one or more products.

5. The system of claim 1, wherein the computer is further configured to:

generate a graphical user interface display visualizing one or more relative importance scores for one or more features.

6. The system of claim 1, wherein the computer is further configured to:
drop one or more features associated with relative importance scores lower than a defined threshold.

7. The system of claim 3, wherein cleansing the input data further comprises:
select a representative sample of data; and
perform a dimensionality reduction on the representative sample of data.

8. A computer-implemented method for autonomously performing tactical segmentation, comprising:
performing, by a computer comprising a memory and a processor, the computer connected to a database, multi-dimension segmentation on input data by computing feature importance to generate multi-dimensional segments;
assigning, by the computer, policy parameters to the supply chain network based on the generated multi-dimensional segments;
training, by the computer, a machine learning model by applying a cyclic boosting process to the standardized features data, wherein the cyclic boosting process iteratively learns relationships associated with the generated multi-dimensional segments; store the machine learning model in the database;
performing, by the computer, multi-dimension segmentation based on the stored machine learning model;
determining autonomously, by the computer, whether data drift has occurred in the input data; and
in response to autonomously determining that data drift has occurred, repeating, by the computer, the performing, assigning and training steps, and storing an updated machine learning model in the database.

9. The computer-implemented method of claim 8, further comprising:
assigning policy parameters to the supply chain network comprising one or more parameters selected from a group consisting of: a minimum order quantity, a maximum order quantity, a discount, a step-size order quantity, and batch quantity rules.

10. The computer-implemented method of claim 8, further comprising:
cleansing, by the computer, the input data by:
converting the input data from one data storage format into another data storage format;
copying one or more pre-discovered features stored in the input data into cleansed data; or
removing one or more pre-discovered features stored in the input data.

11. The computer-implemented method of claim 9, wherein the input data further comprises:
data relating to supply chain entities, supply chain plans, transactions, shipments between supply chain entities, past sales, past demand, purchase data, promotions or events of one or more products.

12. The computer-implemented method of claim 8, further comprising:
generating, by the computer, a graphical user interface display visualizing one or more relative importance scores for one or more features.

13. The computer-implemented method of claim 8, further comprising:

dropping, by the computer, one or more features associated with relative importance scores lower than a defined threshold.

14. The computer-implemented method of claim 10, wherein cleansing the input data further comprises:
selecting, by the computer, a representative sample of data; and
performing, by the computer, a dimensionality reduction on the representative sample of data.

15. A non-transitory computer-readable medium embodied with software for performing strategic segmentation, the software when executed using one or more computers is autonomously configured to:
perform multi-dimension segmentation on input data by computing feature importance to generate multi-dimensional segments;
assign policy parameters to the supply chain network based on the generated multi-dimensional segments;
train a machine learning model by applying a cyclic boosting process to the standardized features data, wherein the cyclic boosting process iteratively learns relationships associated with the generated multi-dimensional segments store the machine learning model in the database;
perform multi-dimension segmentation based on the stored machine learning model;
determine whether data drift has occurred in the input data; and
in response to determining that data drift has occurred, repeat the perform, assign, and train steps, and store an updated machine learning model in the database.

16. The non-transitory computer-readable medium of claim 15, the software further configured to:
assign policy parameters to the supply chain network comprising one or more parameters selected from a group consisting of: a minimum order quantity, a maximum order quantity, a discount, a step-size order quantity, and batch quantity rules.

17. The non-transitory computer-readable medium of claim 15, the software further configured to:
cleanse the input data by transforming the amount of data corresponding to the workflow depth by:
converting the input data from one data storage format into another data storage format;
copying one or more pre-discovered features stored in the input data into cleansed data; or
removing one or more pre-discovered features stored in the input data.

18. The non-transitory computer-readable medium of claim 16, wherein the input data further comprises:
data relating to supply chain entities, supply chain plans, transactions, shipments between supply chain entities, past sales, past demand, purchase data, promotions or events of one or more products.

19. The non-transitory computer-readable medium of claim 15, the software further configured to:
generate a graphical user interface display visualizing one or more relative importance scores for one or more features.

20. The non-transitory computer-readable medium of claim 15, the software further configured to:
drop one or more features associated with relative importance scores lower than a defined threshold.

* * * * *